US009909509B2

(12) United States Patent
Davies et al.

(10) Patent No.: US 9,909,509 B2
(45) Date of Patent: Mar. 6, 2018

(54) GAS TURBINE FUEL SUPPLY METHOD AND ARRANGEMENT

(71) Applicant: Siemens Aktiengesellschaft, Munich (DE)

(72) Inventors: Gareth Huw Davies, Coleby (GB); Michael Smith, North Hykeham (GB)

(73) Assignee: Siemens Aktiengesellschaft, Munich (DE)

( * ) Notice: Subject to any disclaimer, the term of this patent is extended or adjusted under 35 U.S.C. 154(b) by 447 days.

(21) Appl. No.: 14/647,223

(22) PCT Filed: Nov. 5, 2013

(86) PCT No.: PCT/EP2013/073083
§ 371 (c)(1),
(2) Date: May 26, 2015

(87) PCT Pub. No.: WO2014/086541
PCT Pub. Date: Jun. 12, 2014

(65) Prior Publication Data
US 2015/0315979 A1  Nov. 5, 2015

(30) Foreign Application Priority Data
Dec. 3, 2012 (EP) .................................. 12195312

(51) Int. Cl.
*F02C 9/28* (2006.01)
*F02C 9/40* (2006.01)

(52) U.S. Cl.
CPC .................. *F02C 9/28* (2013.01); *F02C 9/40* (2013.01); *F05D 2260/80* (2013.01)

(58) Field of Classification Search
CPC .... F01D 17/08; F02C 9/28; F02C 9/40; F02C 9/48; F02C 9/50; F02C 9/52; F02C 9/32;
(Continued)

(56) References Cited

U.S. PATENT DOCUMENTS 3,695,038 A * 10/1972 Greiner ..................... F02C 9/32
60/39.281
3,918,254 A * 11/1975 Wernberg ................. F02C 9/28
60/39.281
(Continued)

FOREIGN PATENT DOCUMENTS

CN         1944985 A       4/2007
CN         1971013 A       5/2007
(Continued)

OTHER PUBLICATIONS

RU Official Decision of Grant dated Nov. 1, 2016, for RU patent application No. 2015121116.

Primary Examiner — Phutthiwat Wongwian
Assistant Examiner — Loren Edwards
(74) Attorney, Agent, or Firm — Beusse Wolter Sanks & Maire

(57) ABSTRACT

A gas turbine fuel supply method and arrangement is provided. The method of controlling a supply of a fuel to a combustor of a gas turbine having a compressor upstream of the combustor, the method including: supplying the fuel to the combustor; obtaining an inlet air pressure (PT7) at a compressor inlet; obtaining an inlet air temperature (Tinlet) at the compressor inlet; obtaining an outlet air pressure (PT8) at a compressor outlet; estimating a heat input (HIengmodel, HIexpected) of the fuel supplied to the combustor based on the inlet air pressure (PT7), the inlet air temperature (Tinlet) and the outlet air pressure (PT8); comparing the estimated heat input (HIengmodel, HIexpected) with a demanded heat input (FFDEM) to derive an error signal; and controlling a fuel valve regulating the supply of the fuel to the combustor based on the error signal.

18 Claims, 3 Drawing Sheets

(58) Field of Classification Search
CPC .... F05D 2260/80; F05D 2220/32; F23R 3/28; F23R 3/36
USPC ........ 60/773, 782, 785, 39.24, 39.26, 39.27, 60/39.281, 39.461, 39.463, 790, 734, 795
See application file for complete search history.

(56) References Cited

U.S. PATENT DOCUMENTS

| | | | |
|---|---|---|---|
| 4,380,898 | A | 4/1983 | Cantwell |
| 6,195,607 | B1 * | 2/2001 | Rajamani .................. F02C 7/22 60/39.37 |
| 7,966,802 | B2 * | 6/2011 | Szepek ................ H04B 17/345 60/39.281 |
| 2007/0074516 | A1 | 4/2007 | Peck et al. |
| 2007/0113560 | A1 | 5/2007 | Steber et al. |
| 2007/0203669 | A1 | 8/2007 | Hayashi |
| 2007/0245707 | A1 | 10/2007 | Pashley |
| 2009/0192698 | A1 | 7/2009 | Klaser-Jenewein |
| 2012/0079831 | A1 | 4/2012 | Kirzhner |
| 2012/0102914 | A1 * | 5/2012 | Kirzhner ................. F01D 17/08 60/39.281 |
| 2012/0109499 | A1 | 5/2012 | Klaeser-Jenewein |

FOREIGN PATENT DOCUMENTS

| | | |
|---|---|---|
| CN | 102562320 A | 7/2012 |
| EP | 0727574 B1 | 9/1998 |
| EP | 1387073 A2 | 2/2004 |
| EP | 1788309 A2 | 5/2007 |
| EP | 0889222 B1 | 9/2010 |
| EP | 2450551 A2 | 5/2012 |
| EP | 2458178 A2 | 5/2012 |
| JP | 2004190633 A | 7/2004 |
| JP | 2012007539 A | 1/2012 |
| RU | 2003133066 A | 4/2005 |
| RU | 2263799 C2 | 11/2005 |
| RU | 2292471 C1 | 1/2007 |

\* cited by examiner

GAS TURBINE FUEL SUPPLY METHOD AND ARRANGEMENT

CROSS REFERENCE TO RELATED APPLICATIONS

This application is the US National Stage of International Application No. PCT/EP2013/073083 filed Nov. 5, 2013, and claims the benefit thereof. The International application claims the benefit of European Application No. EP12195312 filed Dec. 3, 2012. All of the applications are incorporated by reference herein in their entirety.

FIELD OF INVENTION

The present invention relates to a method and to an arrangement for controlling a supply of a fuel to a combustor of a gas turbine comprising a compressor upstream of the combustor, wherein in particular a varying composition of a supplied fuel is accounted for.

ART BACKGROUND

A ground-based stationary gas turbine, such as a gas turbine comprises a compressor section for compressing air, a combustor section in which fuel with compressed air is burned, and a turbine section, in which the exhausted burned mixture of fuel and air is used to drive rotation of a turbine section, in order to generate mechanical energy, from which in particular also electrical energy may be generated. Such a gas turbine may require fuel supply control which may require knowledge of the fuel heating value, in particular "Lower Caloric Value" or "LCV", and density of the fuel.

Most applications or operating conditions of gas turbines may have a relatively consistent or constant gas fuel supply, so these values may not change extraordinary. However, other applications or operating conditions of a gas turbine may comprise receiving different or various or varying gas fuels, changing between these various gas fuels rapidly. Thereby, the stability of the engine control and the running conditions and the limitation of the allowable engine operating envelope may be compromised.

In circumstances or operating conditions, where a consistent or constant fuel composition is expected as the supplied fuel, the LCV value and the specific gravity ("SG") from which the mass density of the fuel may be calculated, may be provided by the user of the gas turbine who may have performed a fuel analysis, wherein this fuel analysis or its results may have been entered into the control system during commissioning. Thereafter, in a conventional system, the physical/chemical properties of the fuel are assumed to be constant, including assumptions of a constant LCV and SG.

EP 0 727 574 A1 discloses a method and device for regulating the NOx emission of an internal combustion engine, wherein it has been found that there is a relationship between the mechanical efficiency of a combustion engine and the combustion temperature and the combustion temperature is of importance for the NOx emission.

EP 1 387 073 A2 discloses charge density control for an internal combustion engine, wherein a value indicative of a desired charge density of a combustion mixture for the engine is determined as a function of an engine speed of the engine and a load on the engine.

US 2009/0192698 A1 discloses a method for automatically controlling a stationary gas engine, wherein an engine speed control deviation is computed from a set engine speed and an actual engine speed and a set torque is determined as a correcting variable from the speed control deviation by a speed controller, where a set volume flow is determined as a function of the set torque to establish a mixture throttle angle and a gas throttle angle, and wherein the set volume flow is varied to adjust the gas throttle angle by a correction factor.

U.S. Pat. No. 4,380,898 discloses a fuel control system for a gas turbine engine, wherein a trimmer device reduces the effect of variation of engine geometry in cold starts, wherein the trimmer uses a throttle lever angle and engine inlet pressure to compute the desired value of a thrust-related parameter.

EP 2 450 551 A2 discloses systems and methods for compensating fuel composition variations in a gas turbine, the method including monitoring at least one fuel parameter associated with a turbine combustor; monitoring one or more combustion dynamics characteristics associated with the turbine combustor; monitoring one or more performance and emissions characteristics associated with the turbine; estimating fuel composition based at least in part on the at least one fuel parameter, the one or more combustion dynamics characteristics, and the one or more performance and emissions characteristics, and adjusting at least one fuel parameter based at least in part on the estimated fuel composition.

If the fuel composition changes during operation on gas the governor will automatically adjust the fuel valve in order to maintain the closed loop control objectives (normally output shaft speed). However there are operational limits on the engine achieved by means of pre-defined boundaries of fuel heat input and, as the fuel system applies the fuel lower calorific value (LCV) and specific gravity (SG) when interpreting the demanded heat input, these boundaries effectively move if the fuel composition has changed. This could result in compromised transient operation such as compressor surge, or failure to accelerate the gas generator ("hanging"). A further problem could be caused by the governor gains in the PI controller becoming incorrect, potentially compromising operational stability.

There may be a need for a method and an arrangement of controlling a supply of a fuel to a combustor of a gas turbine comprising a compressor upstream of the combustor, wherein an at least partially not controllable variation in the composition or in the physical/chemical properties of the fuel is accounted for, in particular in order to enable a stable operation of the gas turbine.

The above need is satisfied by the subject-matter of the independent claims. The dependent claims specify particular embodiments of the present invention.

SUMMARY OF THE INVENTION

Embodiments provide Estimation of fuel LCV within the engine control system for varying fuel composition.

According to an embodiment of the present invention it is provided a (in particular at least partially processor or computing system implemented) method of controlling a supply (in particular volume flow rate, amount per time, mass flow rate) of a fuel to a combustor of a gas turbine comprising a compressor upstream (relative to flow direction of air being compressed within the compressor) of the combustor, the method comprising supplying (in particular via a conduit or tubing) the fuel to the combustor, obtaining an inlet air pressure (PT7) at a compressor inlet (e.g. where air enters the compressor), obtaining an inlet air temperature (Tinlet) at the compressor inlet, obtaining an outlet air pressure (PT8) at a compressor outlet (e.g. where compressed air exits the compressor and/or enters the combustor), obtaining a air bleed signal (THBOV) indicative of an amount of air not supplied to the combustor (which amount of air may be split off after the compressor and upstream of the combustor), estimating a heat input (e.g. heating input, heating value, energy value, HIengmodel) of the fuel (such as a fluid, in particular gas and/or liquid) supplied to the combustor based on the inlet air pressure, the inlet air temperature, the outlet air pressure and the air bleed signal (THBOV), comparing (e.g. involving arithmetic/logic calculation) the estimated heat input with a demanded heat input (e.g. an intended heat input, FFDEM) to derive an error signal, and controlling a fuel valve (or plural fuel valves) regulating the supply (e.g. flow rate) of the fuel to the combustor based on the error signal.

Heat Input to the engine may be measured in kW and may represent to amount of (chemical or combustion) energy comprised in the mixture of fuel and compressed air per time unit. The heat input may e.g. be defined by the LCV multiplied with a mass flow or volume flow.

The Lower Caloric Value LCV of the fuel is a 'specific' quantity (per unit mass or unit volume of fuel) in kJ/kg or kJ/mA3. In the context of this document and the method the LCV may be volumetric, so is expressed in units of kJ/(normal_mA3) (normal mA3 being the volume of the gas at 0 degrees Celsius at ISO pressure), and Wobbe Index may be defined as volumetric LCV/root (SG).

The gas turbine may comprise one or more combustors which are arranged around a rotation shaft of the gas turbine, in particular circumferentially equally spaced apart from each other. The gas turbine may comprise a compressor section in which air taken from the environment is compressed by plural rotating blades which may be connected to the rotation shaft of the gas turbine. The combustor or the combustors of the gas turbine may be arranged at an outlet of the compressor where the compressed air is released from the compressor section of the gas turbine. The combustor may comprise one or more inlets to allow supply of the compressed air into the combustor. The fuel may be supplied to the combustor using a tubing or conduit at which the fuel valve may be installed, in order to control a flow rate (e.g. mass flow, volume flow) of the fuel flowing through the tubing into the combustor. In the combustor, a mixture of the supplied fuel and the compressed air may be burned.

The exhaust of the burned mixture of fuel and compressed air may be output by the combustor and supplied to a turbine section of the gas turbine arranged downstream of the combustor. The turbine section may receive the exhausted burned mixture of fuel and compressed air which may have a high velocity and high temperature. The exhausted burned mixture of gas and compressed air may drive plural blades of the turbine section which may be fixed to the rotation shaft of the gas turbine. Thereby, mechanical energy, in particular rotation energy, may be generated. The rotating turbine shaft may e.g. drive an electric generator for producing electric energy from the mechanical energy.

The inlet air pressure, the inlet air temperature and/or the outlet air pressure may be measured values or values which may be derived based on other values or quantities. For example, the inlet air pressure may be measured not directly at a location of the compressor inlet but may be measured at a location apart from the location of the compressor inlet and the air pressure at the location of the compressor inlet may be derived from the measurement of the air pressure performed at a location apart from the location of the compressor inlet. Thereby, the physical construction or design of the engine as well as the operating condition may be taken into account. Similarly, also the inlet air temperature and/or the outlet air pressure may be measured not directly at the compressor inlet or the compressor outlet, respectively, but at locations apart from these positions and the inlet air temperature and the outlet air pressure, respectively, may be derived from these measurements, in particular using a physical (thermodynamic) model.

The Caloric Value may be related by the amount of heat released during the combustion of a specified amount of the fuel. The Caloric Value (also referred to as heating value or energy value) may be expressed in units of energy per unit of the fuel, in particular measured in units of energy per mass, such as kJ/kg. The Caloric Value may in particular relate or be equivalent to the lower heating value or Lower Caloric Value (LCV) which is determined by subtracting the heat of vaporization of the water vapour from the higher heating value. Thereby, it is accounted for that the energy required to vaporize the water is not realized as heat during the combustion of the fuel and the compressed air within the combustor.

The quantity known as lower heating value (LHV) (net Calorific Value (NCV) or Lower Calorific Value (LCV)) may be determined by subtracting the heat of vaporization of the water vapor from the higher heating value. This treats any H20 formed as a vapor. The energy required to vaporize the water therefore is not realized as heat. LHV calculations assume that the water component of a combustion process is in vapor state at the end of combustion, as opposed to the higher heating value (HHV) (a.k.a. gross calorific value or gross CV) which assumes that all of the water in a combustion process is in a liquid state after a combustion process.

The LHV assumes that the latent heat of vaporization of water in the fuel and the reaction products is not recovered. It is useful in comparing fuels where condensation of the combustion products is impractical, or heat at a temperature below 150° C. cannot be put to use.

The higher heating value (HHV) or higher caloric or calorific value (HCV) is determined by bringing all the products of the combustion (the supplied fuel and the compressed air) back to the original pre-combustion temperature and in particular condensing any vapour produced. In particular, the higher heating value is the same as the thermodynamic heat of combustion.

In particular, if the fuel changes to another fuel during operating the gas turbine, the Caloric Value may change to another Caloric Value which may affect the mechanical output of the gas turbine and may therefore require controlling the fuel valve and which may in particular require to change the flow rate of the other fuel compared to the flow rate of the fuel previously applied, in order to maintain stable gas turbine mechanical output.

The error signal may in particular be derived by forming a difference between the estimated heat input and the demanded heat input. The demanded heat input may be set by an engine governor or by an engine control system and the demanded heat input may in particular be based on a demanded mechanical output and/or demanded rotation speed and/or demanded load, etc. of the gas turbine. The controlling may in particular be performed using a closed control loop.

The proposed control method may not require to measure the Caloric Value for example using a calorimeter which has been observed to be very cumbersome and which has been found to be too slow for effective engine control. Conventional calorimeters may provide updated information regarding the measured Caloric Value which requires processing a sample of the fuel over between 3 min and 30 min depending on the calorimeter. Further, relying on a calorimeter introduces a dependency on the calorimeter for successful engine operation. By estimating the heat input (or the Caloric Value which may in particular directly or indirectly be derived from the heat input, e.g. when the mass flow or volume flow is known) of the fuel using the proposed method, this disadvantage may be overcome.

The control method may also apply a relationship between the engine power output (in particular mechanical power output) and expected fuel valve angle to compare an expected angle against the current value in operation and adjust the fuel supply pressure, hence density, in order to ensure normal fuel valve angles. Further, operating envelope limits based on specific fuel valve angles may provide acceptable control.

If the kind or type or composition of the fuel changes, the fuel valve may be controlled based on the Caloric Value or Wobbe Index derived from the error signal between the estimated heat input and the demanded heat input, in order to arrive at an operation condition or running condition, in particular regarding mechanical power output of the gas turbine, which corresponds to a demanded running condition.

Thereby, in case where no control about the composition or the kind or the type of the fuel is present, the gas turbine can be operated as demanded.

Online calorimeters or gas chromatograph may be provided to measure fuel LCV and SG, feeding data to the engine control software. These devices may operate on an update cycle of a few minutes, which is not consistent with the allowable rate of change of fuel composition, thus compromising operation between updates. In addition the reliability of such devices is not necessarily sufficient to ensure contract key performance indicators (KPIs) during operation.

The form of calculation used by the fuel control module may require values of LCV and SG as inputs. However the calculation is proportional to LCV and l/root (SG), which is equivalent to Wobbe Index (WI), making it unnecessary to have accurate SG data if the WI can be defined. The engine and the control system may be used according to embodiments of the invention to estimate the fuel WI and may provide a faster update, subject to the engine operating at steady state temperatures before the estimation. Thus a change in the fuel followed by a load transient may be accommodated by means of this estimation. However the fundamental accuracy of this method may be lower than that of the calorimeter so it may be used in conjunction with the calorimeter rather than instead of the calorimeter.

The amount of air not supplied to the combustor may be air extracted before combustion, to maintain combustor outlet temperature at a particular temperature range or at a particular temperature and/or in order to control the emission (e.g. type and/or concentration of reaction products) of the gas turbine. In particular, at very high load no air may be extracted upstream of combustion and all air output by the compressor (apart from what is needed for cooling of the turbine components) may be supplied to the combustor. Also in particular running conditions or circumstances, compressed air may also be used in a varying amount to cool particular components of the gas turbine. By supplying varying amounts of air to the combustor, the estimation of the heat input of the fuel may be affected. In particular, taking into account that a particular amount of air is not supplied to the combustor may improve the accuracy of estimating the heat input of the fuel such that the estimated heat input of the fuel more closely resembles or equals the actual heat input of the fuel.

Thereby, the gas turbine may be controlled in a better way to achieve a demanded running condition.

According to an embodiment of the present invention, the air bleed signal comprises a bleed valve setting.

According to an embodiment of the present invention, estimating the heat input comprises forming a pressure ratio (PRC87) between the outlet air pressure (PT8) and the inlet air pressure (PT7) and estimating the heat input based on the pressure ratio.

The pressure ratio may be a suitable quantity in order to estimate the heat input. Thereby, the method may be simplified.

According to an embodiment of the present invention, estimating the heat input based on the pressure ratio comprises using at least one curve fit based on plural measurements performed on at least one gas turbines, the curve fit relating measured pressure ratio to measured heat input, wherein the curved fit is in particular described by a polynomial of second order having a positive first coefficient (a coefficient of the polynomial multiplied with the pressure ratio) and a positive second coefficient (a coefficient of the polynomial multiplied with the square of the pressure ratio), a representation of the curve fit being in particular stored in an electronic storage.

In particular, plural measurement points may be obtained from measurements performed on at least one gas turbine and the measurement points may be depicted in a graph having an abscissa denoting the pressure ratio and having an ordinate denoting the heat input or the heat input fuel flow in units Watt (W) The at least one curve fit may be obtained by a least square fit of the measurement points to a polynomial, in particular to a polynomial of second order which describes the heat input fuel flow as the sum of a constant term, the first coefficient multiplied by the pressure ratio and the second coefficient multiplied with the square of the pressure ratio.

Using the experimental measurements may allow to derive a highly accurate relationship between the pressure ratio and the heat input from the fuel flow. Thereby, the method may be improved regarding accuracy of the estimated heat input.

According to an embodiment of the present invention, the at least one curve fit comprises: a first curve fit obtained based on measuring data, where no air was bled upstream of the combustor, a second curve fit obtained based on measuring data, where a portion, in particular between 5% and 15%, of air was bled upstream of the combustor, wherein based on the first curve fit a first heat input is derived and wherein based on the second curve fit a second heat input is derived, wherein based on the first heat input and the second heat input the estimated heat input is derived.

Considering the two cases where no air was bled upstream of the combustor and where a portion of the air was bled upstream of the combustor may lead to an improved accuracy of estimating the heat input. In particular, the first heat input and the second heat input correspond to the condition, where no air was bled upstream of the combustor and where a portion of the air was bled upstream of the combustor, respectively.

According to an embodiment of the present invention, the method further comprises: deriving a corrected heat input using a first function comprising the first heat input and the second heat input, if the pressure ratio exceeds a threshold, the threshold being in particular between 4 and 8, deriving the corrected heat input using a second function comprising at least the first heat input, if the pressure ratio does not exceed the threshold, wherein estimating the heat inputs is further based on the corrected heat input.

The first function may be a mathematical function for deriving the corrected heat input in dependence of the first heat input and the second heat input only in this case, when the pressure ratio fulfils the criterion to exceed the threshold. Further, the corrected heat input may be derived as a second mathematical function in dependence of only or at least the first heat input, if the pressure ratio does not satisfy the criterion, thus does not exceed the threshold.

Thereby, the influence of air bled off before the combustor may be taken into account more accurately. In particular, if the pressure ratio is above the threshold, an influence of bled air may be higher than if the pressure ratio does not exceed the threshold.

According to an embodiment of the present invention, the method further comprises estimating a portion of air bled upstream of the combustor based on a bleed valve setting, in particular using a bleed valve characteristic, wherein the first function comprises the estimated portion of bled air.

The bleed valve may comprise one or more valves arranged at different locations upstream of the combustor, or within the compressor section of the gas turbine. The bleed valve characteristics may be represented as a table, a graph, look-up table, or the like and may be stored in an electronic storage. The bleed valve characteristic may indicate, that the flow of air is zero in a first valve angle range and it may indicate that the percent flow of the air increases linearly in a second valve angle range being adjacent to the first valve angle range. By using the bleed valve setting, determination of the amount of air which is bled off upstream of the combustor may be improved regarding accuracy.

According to an embodiment of the present invention, the method comprises calculating the estimated heat input from the corrected heat input, the inlet air pressure (PT7) and the inlet air temperature (Tinlet).

The estimated heat input may be derived using a mathematical formula, wherein in particular the corrected heat input is multiplied with the inlet air pressure and multiplied with the square root of a term comprising the inlet air temperature.

Thereby, the estimated heat input may be calculated in an accurate way from the available input quantities.

According to an embodiment of the present invention, the fuel valve is controlled using a Pi-controller to which the error signal is supplied as an input, the method in particular further comprising: deriving a volume specific heat input (also referred to as Wobbe index which may be based on volumetric LCV) for the fuel based on the error signal, and transmitting the derived volume specific heat input to the fuel valve, wherein based on the derived mass specific heat input the fuel valve is adjusted for controlling the supply of fuel.

The Wobbe Index (WI) or Wobbe number is referred to an indicator of the interchangeability of fuel gases such as natural gas, liquefied petroleum gas (LPG), and town gas and is frequently defined in the specifications of gas supply and transport utilities. If two fuels have identical Wobbe Indices then for given pressure and valve settings the energy output may be identical.

The Pi-controller may be considered as a particular implementation of a closed loop controller. The volume specific heat input may in particular be calculated as the Caloric Value, in particular Lower Caloric Value, divided by the square root of the specific gravity. The specific gravity may be the mass density of the fuel referred to the mass density of water. Thereby, the method may be simplified.

According to an embodiment of the present invention, the method further comprises: setting the valve to a flow rate of the fuel such that the error signal is zero, the method afterwards comprising: supplying another fuel to the combustor, the other fuel being different from the fuel, obtaining another inlet air pressure (PT7) at the compressor inlet, obtaining another inlet air temperature (Tinlet) at the compressor inlet, obtaining another outlet air pressure (PT8) at the compressor outlet, estimating another heat input (HIengmodel) of the other fuel supplied to the combustor based on the other inlet air pressure, the other inlet air temperature and the other outlet air pressure, comparing the other estimated heat input with the demanded heat input to derive another error signal, and controlling the valve based on the other error signal such that the valve is set to another flow rate of the other fuel different from the flow rate of the fuel previously applied.

Thereby, the method may handle a situation, where the fuel changes to another fuel, wherein the composition, kind or type of the fuel may be different from the composition kind or type of the other fuel. In particular, the Caloric Value of the fuel and the other fuel may be different from each other. The change of the Caloric Value due to the change from the fuel to the other fuel may be detected and may be used to change the adjustment of the fuel valve, in order to maintain a demanded heat input or to maintain a demanded mechanical power output. Thereby, the control method may support additional operating conditions compared to a conventional control method.

According to an embodiment of the present invention, the other flow rate is higher than the flow rate, if the other Caloric value is lower than the Caloric Value.

In particular, the demanded heat input may be maintained even if the fuel changes to the other fuel. Thereby, a smooth operation of the gas turbine may be accomplished and the stability of the operation may be improved.

It should be understood that features which are individually or in any combination disclosed, applied, described or mentioned in the context of a method of controlling a supply of a fuel to a combustor may also be applied individually or in any combination to an arrangement for controlling a supply of a fuel to a combustor of a gas turbine comprising a compressor upstream of the combustor and vice versa according to an embodiment of the present invention.

According to an embodiment of the present invention it is provided an arrangement for controlling a supply of a fuel to a combustor of a gas turbine comprising a compressor upstream of the combustor, the arrangement comprising: a fuel valve adapted to supply the fuel to the combustor, a processor (e.g. within a computing apparatus) adapted to obtain an inlet air pressure (PT7) at a compressor inlet, to obtain an inlet air temperature (Tinlet) at the compressor inlet, to obtain an outlet air pressure (PT8) at a compressor outlet, to obtain a air bleed signal (THBOV) indicative of an amount of air not supplied to the combustor, to estimate a heat input (HIengmodel) of the fuel supplied to the combustor based on the inlet air pressure, the inlet air temperature, the outlet air pressure and the air bleed signal (THBOV), to compare the estimated heat input with a demanded heat input (FFDEM) to derive an error signal, and to control the fuel valve regulating the supply of the fuel to the combustor based on the error signal.

In particular, the Lower Caloric Value and the specific gravity may be combined in the form of a Wobbe index (WI).

Thereby, the adjustment of the valve may only be carried out during a "stable" engine operation, where the obtained parameters PT7, PT8, Tinlet have not changed significantly for a few minutes, in particular for a time interval ranging between 1 minute and 20 minutes.

According to an embodiment of the present invention, a gas turbine comprising an arrangement for controlling a supply of a fuel to a combustor of the gas turbine is provided.

According to another embodiment of the present invention, a simple model of the engine thermal efficiency as a characteristic function of a turbine inlet temperature (TIT), i.e. the temperature of the burned mixture of fuel and compressed air which is introduced into the turbine section of the gas turbine in order to drive the rotation shaft, is used, in order to estimate the heat input of the fuel which is supplied to the combustor. Thereby, the turbine inlet temperature may be provided by existing control algorithms or computing algorithms or may be provided by measurements. The estimated heat input of the fuel may then be compared to the demanded heat input which is demanded from the gas turbine control fuel module or which may be demanded by the engine governor. The difference may then be used as an error term in an integrator control module to adjust the fuel supply valve which controls the supply of fuel, based on the estimated Caloric Value and also based on the specific gravity. In particular, the Lower Caloric Value and the specific gravity may be combined in the form of a Wobbe index (WI). The integrator control module may adjust the fuel valve with the objective to eliminate the error value. Thereby, similarly as one of the described embodiments above, the adjustment of the valve may only be carried out during a "stable" engine operation, where the turbine inlet temperature of the gas turbine has not changed significantly for a few minutes, in particular for a time interval ranging between 1 minute and 20 minutes.

According to embodiments of the present invention, the control method may improve the stability of operation of the gas turbine, even if the fuel changes or the composition of the fuel changes and thereby transient operation following a change in fuel composition may be ensured independent of the update time from any calorimeter that may be fitted at a measurement location. If the fuel composition or the properties of the fuel, in particular the Lower Caloric Value or in general any heat-related value are known at any time, perhaps during commissioning, then this information may be used to tune (e.g. calibrate) the control methods by means of an efficiency trim value calculated from the difference between the Wobbe index derived by the estimation and the known or actual value of the fuel.

Embodiments of the present invention are now described with reference to the accompanying drawings. The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF EMBODIMENTS

Figure 1:
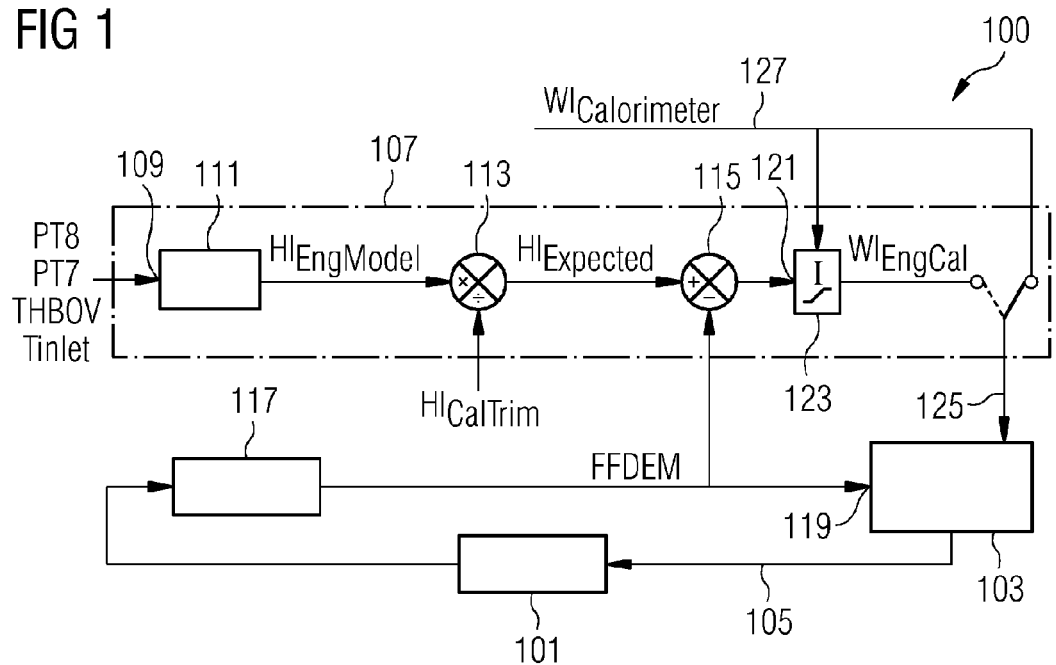
FIG. 1 schematically illustrates an arrangement for controlling a supply of a fuel to a combustor of a gas turbine according to an embodiment of the present invention which is adapted to perform a method of controlling a supply of a fuel to a combustor of a gas turbine according to an embodiment of the present invention.

FIG. 1 schematically illustrates an arrangement 100 for controlling a supply of a fuel to a combustor 101 of a gas turbine according to an embodiment of the present invention which is adapted to perform a method of controlling a supply of a fuel to a combustor of a gas turbine according to an embodiment of the present invention. The arrangement 100 comprises a fuel valve 103 adapted to supply a fuel 105 to a combustor 101 (of a gas turbine), wherein the fuel 105 is supplied via a fuel pipe. Further, the arrangement 100 comprises a processor 107 which is adapted to obtain an inlet air pressure PT7 which relates to a pressure of air at a compressor inlet, to obtain an inlet air temperature Tinlet which relates to a temperature of air at the compressor inlet, and to obtain an outlet air pressure PT8 which relates to a pressure of air at a compressor outlet. Thereby, the values of the inlet air pressure PT7, of the inlet air temperature Tinlet and the outlet air pressure PT8 may also be referred to as property values 109 of at least one physical property of air used for burning the fuel in the combustor.

The processor 107 is further adapted to obtain an air bleed signal THBOV, in particular a bleed valve setting or in particular a bleed valve angle, which is indicative of an amount of air not supplied to the combustor 101 comprised in the gas turbine. In other embodiments no bleeds are used and all air is supplied to the combustor. The property value 109 of the at least one physical property of air used for burning the fuel in the combustor comprises the aforementioned values of physical quantities. The property values 109 are supplied to an engine model 111 which is adapted to estimate a heat input HIengmodel of the fuel 105 supplied to the combustor 101 based on the property values 109 of at least one physical property of air.

The estimated heat input HIengmodel is supplied to an arithmetic element 113 which is provided to apply a trimming factor HIcaltrim to the estimated heat input HIengmodel according to a particular embodiment of the present invention, in which a calorimeter measurement for determining a measured Caloric Value or Wobbe Index is determined.

According to an alternative embodiment, the calorimeter measurement is not used in which case the trimming factor HIcaltrim is set to unity such that the adjusted estimated heat input HIexpected equals the estimated heat input HIengmodel according to this embodiment.

The adjusted estimated heat input HIexpected is supplied to an arithmetic addition element 115 which subtracts from the adjusted estimated heat input HIexpected a demanded heat input FFDEM which is demanded by an engine governor 117 which also supplies a corresponding control signal 119 to the fuel valve 103. In particular, the control signal 119 may represent the demanded heat input FFDEM generated by the engine governor 117.

The addition arithmetic element 115 outputs an error signal 121 which is thereby derived from the estimated heat input HIengmodel or the adjusted estimated heat input HIexpected and the demanded heat input FFDEM. The error signal 121 is supplied to an integration element 123 which may in general be embodied as a Pi-controller. The integration element 123 integrates the error signal 121 over time and outputs a mass specific heat input (in particular Wobbe index) WIengcal representing an estimated Wobbe index of the fuel, wherein the estimation uses the engine model 101 which will be described in more detail below. Via a control line 125, the derived mass specific heat input WIengcal is supplied to the fuel valve 103, based on which the fuel valve 103 adjusts the flow rate of the fuel 105 in order to minimize or eliminate the error signal 121.

According to an alternative embodiment of the present invention, additionally to estimating the Wobbe index WIengcal using the engine model 101, a measured Caloric Value LCVmea is used to calculate a measured Wobbe index WIcalorimeter which is provided via a control line 127 and occasionally supplied to the fuel valve 103, in order to trim the estimated Wobbe index WIengcal. The calculation of the measured Wobbe index WIcalorimeter will be described with reference to FIG. 5 below.

Further, the measured Wobbe index WIcalorimeter is used in order to derive the trimming factor HIcaltrim which is supplied to the arithmetic element 113, in order to adjust the estimated heat input HIengmodel to derive an adjusted estimated heat input HIexpected, as will be described below with reference to FIG. 6.

Figure 2:
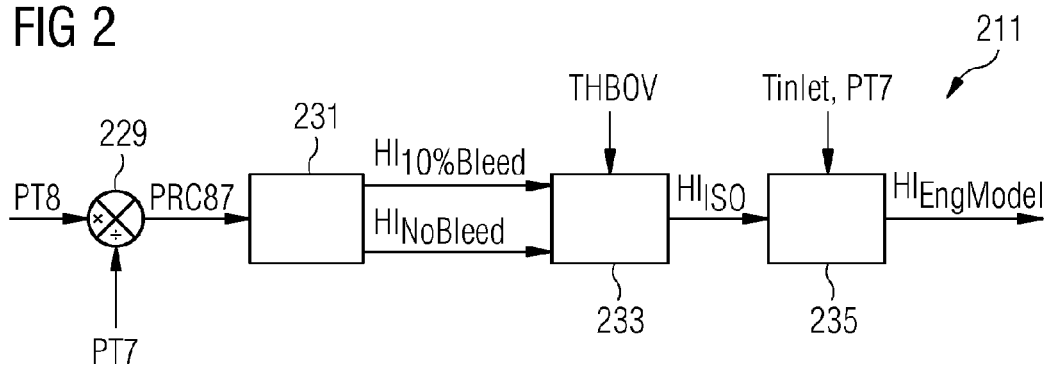
FIG. 2 schematically illustrates an engine model which is used in the arrangement illustrated in FIG. 1 and which is used in a method of controlling a supply of a fuel to a combustor according to an embodiment of the present invention.

FIG. 2 schematically illustrates an engine model 211 according to which the engine model 111 illustrated in FIG. 1 may be implemented according to an embodiment of the present invention.

An outlet air pressure PT8 representing a pressure of air at an outlet of the compressor is received by an arithmetic multiplication/division element 229. Further, the arithmetic multiplication/division element 229 receives as a divisor an inlet air pressure PT7 representing a pressure at a compressor inlet. The multiplication/division element 229 outputs a pressure ratio PRC87 (PT8/PT7) which is supplied to a heat input calculation element 231 which may also be referred to as HI-calculation element. Within the HI-calculation element 231, a first heat input HInoBLEED is calculated and further a second heat input HI10% BLEED is calculated. Thereby, the first heat input and the second heat input are calculated according to the following formulas:

Heat Input Calculation:

Calculate ISO-corrected heat input as function of pressure ratio, PRC87, for zero and 10% bleed:

$$HInoBLEED = a2*PRC87^2 + a1*PRC87 + a0$$

$$HI10\% \ BLEED = b2*PRC87^2 + b1*PRC87 + b0$$

The equations here are specific to a particular gas turbine. Other engines may use different coefficients and or different bleed fraction, which may be determined by known methods.

These particular formulas have been derived based on plural measurements performed on at least one gas turbine which will be described in detail with reference to FIG. 3 below. The first heat input HInoBLEED and the second heat input HI10% BLEED are supplied to a bleed effect calculation block 233 which also receives an air bleed signal THBOV which is indicative of an amount of air not supplied to the combustor. The air bleed may be taken from the supply to the combustor, immediately upstream of the combustor, and from the same pressure chamber from which the outlet air pressure was derived or measured.

The bleed effect calculation block 233 takes into account if some of the compressed air is actually not supplied to the combustor. Thereby, the percentage of bleed is calculated according to the following formulas:

Calculate the % bleed (of engine inlet air mass flow), Bleed %, from THBOV, based on simplified valve characteristics:

if $THBOV <= 10$ Bleed %=0 if $THBOV > 10$ Bleed %=$(THBOV-10)/0.7$

These equations may be specific to the gas turbine in this example. Other engines may use different coefficients or form.

Furthermore, the bleed effect calculation block 233 calculates after estimating the percentage of bled air a corrected heat input HIiso from the first heat input and the second heat input using a first function or a second function depending on whether the pressure ratio PRC87 is larger than a threshold or not. The threshold may be chosen depending on the application and gas turbine and may be e.g. 6. Thereby, the calculation is performed according to the following formulas:

Calculate ISO corrected heat input by linearly interpolation if $PRC87 > 6$ HIiso=HIISOnoBleed+Bleed %/10*
(HIISO10% bleed−HIISOnoBleed)

if $PRC87 <= 6$ HIiso=HIISOnoBleed

The equations here may be specific to the gas turbine in the example. Other engines may use different equations or different coefficients.

The bleed effect calculation block 233 thereby outputs the corrected heat input HIiso and supplies it to an ambient correction element 235 which further receives the inlet air temperature Tinlet and furthermore the inlet air pressure PT7 which has already been supplied to the arithmetic element 229. The estimated heat input HIengmodel is thereby calculated by the ambient correction block 235 according to the following formula:

Calculate the current heat input from the ISO-corrected heat using the engine air inlet pressure PT7 [bar] and temperature Tinlet [degree Celsius]

$$HIEngModel = HIISO*PT7/1.01325*\mathrm{sqrt}((Tinlet+273.15)/288.15)$$

The estimated heat input HIengmodel derived using the engine model 201 illustrated in FIG. 2 may for example be used within the arrangement 100 as the estimated heat input HIengmodel.

Figure 3:
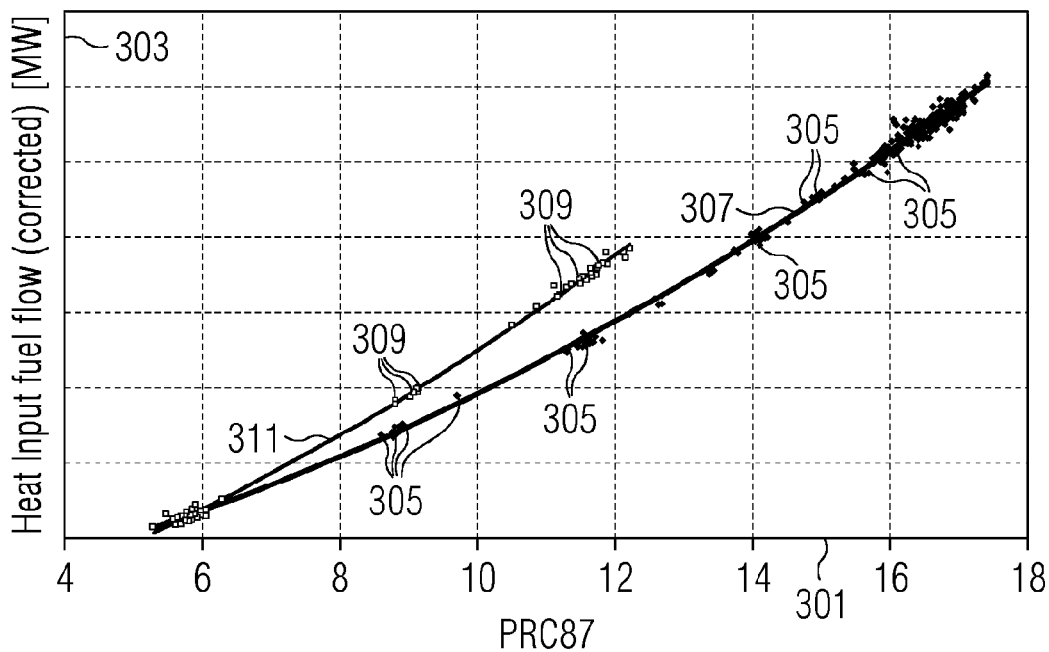
FIG. 3 schematically illustrates a graph for defining a heat input flow value to a gas turbine engine in dependence of a pressure ratio of air which may be used in a method and/or in an arrangement for controlling a supply of a fuel to a combustor according to an embodiment of the present invention.

FIG. 3 illustrates a graph for deriving two mathematical expressions for calculating the first heat input and the second heat input from the pressure ratio PRC87 which may be used according to an embodiment of the present invention.

On an abscissa 301, the pressure ratio PRC87, i.e. PT8/PT7, is indicated while on an ordinate 303, the heat input fuel flow in units Mega Watt (MW) representing the heat input of the fuel is indicated. The small diamonds 305 represent measurement points of the pressure ratio versus the heat input fuel flow performed at gas turbines of a type which is to be controlled by the control method, wherein no air was bled upstream of the combustor. Applying a least square fit a polynomial of second order which is denoted by reference sign 307 was fit to the measurement data 305. The polynomial of second order in the pressure ratio PRC87 was used to calculate the first heat input in dependence of the pressure ratio PRC87.

The small squares 309 represent measurement points performed on gas turbines indicating the pressure ratio PRC87 versus the heat input fuel flow, wherein 10% of the air was bled off upstream of the combustor. A polynomial of second order 311 was fit using a least square procedure to the measurement data 309 and was used to derive the second heat input within the HI-calculation element 231 illustrated in FIG. 2.

Figure 4:
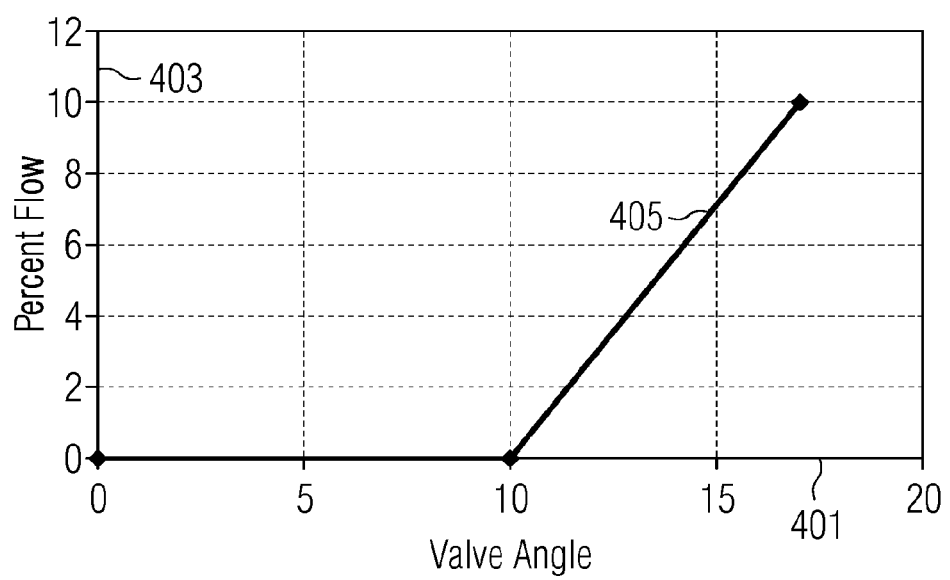
FIG. 4 illustrates a graph of a bleed valve characteristics for bleeding off air upstream of a combustor which relationship is used in an arrangement and/or in a method of controlling a supply of a fuel to a combustor according to an embodiment of the present invention.

FIG. 4 illustrates an exemplary graph of a bleed valve characteristics 405 specific for a particular valve which is used according to an embodiment of the present invention to estimate the percentage of bled air upstream of the combustor. On an abscissa 401, the air valve angle is indicated, while on an ordinate 403, the percent flow is indicated. The curve 405 indicates the dependency of the percent flow from the air valve angle. As can be taken from FIG. 4, the percent flow is 0 for an air valve angle between 0 and 10 and the percent flow increases in a linear manner in a range of the air valve angle between 10 and 17 from the percent flow of 0 to 10. Thereby, using the air valve angle, the percentage of bled air can be estimated according to an embodiment of the present invention, as is used in the bleed effect calculation element 233 in FIG. 2. Other valves may have a different characteristic.

Figure 5:
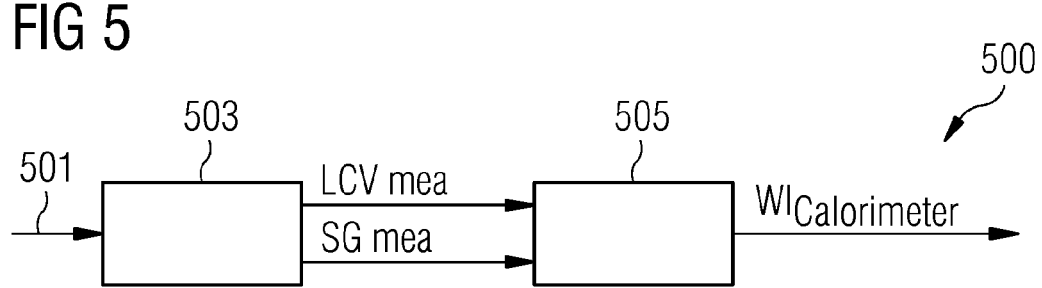
FIG. 5 schematically illustrates a calorimeter Wobbe index calculation scheme which may be utilized in an arrangement and/or in a method for controlling a supply of a fuel to a combustor of a gas turbine according to an embodiment of the present invention.

FIG. 5 schematically illustrates a calorimeter Wobbe index calculation procedure 500 which may be used in order to derive the measured Wobbe index WIcalorimeter which is used in the arrangement 100 illustrated in FIG. 1 as an input quantity via line 127. The calorimeter Wobbe index calculation scheme 500 illustrates a calorimeter which receives a sample 501 of fuel 105 which is supplied to the gas turbine 101. The sample of the same kind of fuel which is delivered to the gas turbine 101 may be taken from a supply pipe or supply pipe system which may be several meters, such as between 1 m and 20 m, upstream of the combustor. The sample 501 of the fuel 105 is burned under controlled conditions (such as standard conditions) within the calorimeter 503 and the generated heat is measured within the calorimeter 503. Further, the calorimeter 503 may have the capability to derive the specific gravity SG of the sample 501 of the fuel. From the generated heat due to the controlled combustion of the sample 501 of the fuel, the calorimeter 503 derives a Caloric Value, in particular the Lower Caloric Value LCV of the fuel. The thus measured Lower Caloric Value LCVmea as well as the specific gravity SGmea are supplied to a WI-calculation element 505 which calculates from the Lower Caloric Value LCVmea and the specific gravity SGmea the measured Wobbe index WIcalorimeter according to the following formula:

$$WI_{Calorimeter} = \frac{LCV}{\sqrt{SG}}$$

Calculation:

The same information may be provided from a Gas Chromatograph located identically as for the calorimeter, but which measures the composition of the gas sample and enables calculation of the LCV and SG of said sample.

The measured Wobbe index may then be supplied to the arrangement 100 for controlling a supply of a fuel to a combustor of a gas turbine 101 according to an embodiment of the present invention.

Figure 6:
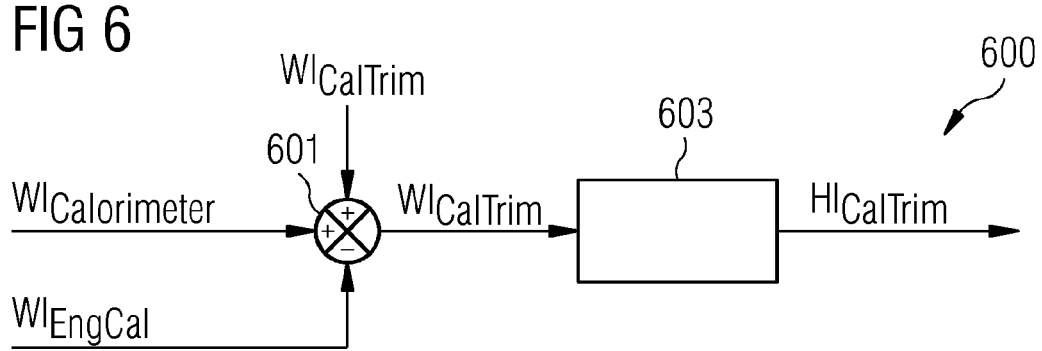
FIG. 6 schematically illustrates a calorimeter trimming factor calculation which may be utilized in a method and/or in an arrangement for controlling a supply of a fuel to a combustor of a gas turbine according to an embodiment of the present invention.

FIG. 6 illustrates a scheme 600 for determining a trimming factor HIcaltrim which may be used by the arrangement 100 illustrated in FIG. 1 as an input to the arithmetic element 113, in order to calculate an adjusted estimated heat input HIexpected from the estimated heat input HIengmodel.

According to the scheme 600, the measured Wobbe index (such as derived using the scheme 500 illustrated in FIG. 5) WIcalorimeter is received, following the analysis of each sample at intervals defined by the equipment in scheme 500, by an addition element 601. Further, the addition element 601 receives the estimated Wobbe index WIengcal which is for example output by the integration element 123 of the arrangement 100 illustrated in FIG. 1. The quantity WIcaltrim is set to the difference between the latest values of WIcalorimeter and WIengcal. The addition element 601 further receives the previous value of the quantity WIcaltrim for derivation of the new value of quantity WIcaltrim. The quantity WIcaltrim is supplied to a heat input trim calculation block 603 which derives the heat input trimming factor HIcaltrim according to the following formula:

$$HI_{CalTrim} = 1 - \frac{WI_{CalTrim}}{WI_{Calorimeter}}$$

HI Trim Calculation:

Embodiments of the control methods are further detailed below:

From the engine thermodynamic characteristics, using a simple model of heat input as a function of engine pressure ratio and bleed flow, the heat input supplied by the fuel may be estimated. Comparison of this value with the current control system demand heat input may indicate a difference in the fuel composition affecting WI. The difference may then be used to estimate a new value of WI. When used in parallel with a fuel calorimeter the estimation may also be trimmed to maintain accuracy, so that the changes in WI may be identified quickly but the absolute values remain based on the calorimeter.

The method may comprise the following inputs (not all need to mandatory):
  demanded fuel heat input: FFDEM which is the fuel heat input (typically in kW) demanded by the engine governor for the fuel module to supply to the engine.
  Operating temperature: e.g. Tfire (turbine inlet temperature at turbine section inlet being equivalent to combustor outlet temperature) from control system. This may be the control system temperature value equivalent to the combustor outlet temperature or the turbine inlet temperature ('TIT' or 'TET')

Compressor operating parameters:

Inlet Pressure from control system (PT7 in bar)

Outlet pressure from control system (PT8 in bar)

Inlet Temperature from control system (Tinlet degree Celsius)

Outlet Temperature from control system (TCD degree Celsius)

Bleed valve angle (may be e.g. an average of taken from 2 valves): From control system. Used for emissions control by means of extracting air before combustion to maintain combustor outlet temperature (THBOV)

LCV and SG: From Gas Chromatograph or calorimeter— update time of several minutes The following definitions/terminology may apply:

WICalorimeter: The value of Wobbe Index derived from the calorimeter or gas chromatograph measurements.

WIEngCal: The value of Wobbe Index estimated from the engine performance by the >engine calorimeter'

HIEngModel: The expected value of fuel supplied heat input required to run the engine at that operating condition, estimated directly from the engine characteristics model, HIExpected: The expected value of fuel supplied heat input required to run the engine at that operating condition, estimated from the engine characteristics model, but adjusted for engine degradation or aligned using fuel properties measurement from calorimeter or gas chromatograph.

HICalTrim: A trimming factor, derived from the calorimeter measurements or a degradation model, to be applied to the value of HIEngModel.

The calorimeter or gas chromatograph may output LCV and SG at each update time. These may be combined into a WI value (see FIG. 5). Fault detection is performed in that both the output values from the calorimeter should be monitored to ensure their values are within the range of expectation based on site fuel specification.

The Engine calorimeter Calculation may be performed as follows:

Before the engine is started the current value from the calorimeter may be fed to the fuel valve module as well as being used to initialise the integrator 123 within the >engine calorimeter'. At this stage the engine model may not be used to estimate WI. On starting the engine and reaching minimum load the engine model operates, with an initial value of HICalTrim=1, and may provide estimates of heat input. These may be compared with the governor FFDEM in order to generate an error 121 which is then integrated out by changing the estimated WI (WIEngCal). This value may provided to the fuel module 103 instead of the direct calorimeter value, causing the FFDEM value from the governor 117 to change in order to maintain constant engine operation, thus eliminating the error term.

On starting the engine, if the fuel supply has changed but the supply pipes to the engine are full of the previous composition, then part way through the start the composition may change abruptly, potentially exceeding limits and causing a start fail. This situation may be rectified automatically on restart, provided that the calorimeter has provided an updated value. It may also be avoided by venting the supply lines before start. If the calorimeter is not available at the commencement of the start, the last value of WIEngCal may be used.

The engine calorimeter calculation may only be carried out, if the >steady state' criterion below is satisfied:

Engine Steady State Criterion:

Record max and min values of temperature control parameter e.g. Tfire (turbine inlet temperature) over a rolling 5 minutes prior to current time.

Steady, if Tfiremax−Tfiremin<Tss

Where Tss is a parameter initially set to 20° C.

The Calorimeter Trim Calculation may be performed as follows referring to FIG. 6:

This routine may run once on receipt of an update from the calorimeter provided that:

1/ WIEngCal has been stable for at least one calorimeter update interval (+/−2% (adjustable parameter in system)) AND WICalorimeter=previous value+/−2%

2/ Application of the previous update has been completed.

3/ calorimeter LCV and SG monitoring confirms that both values are within site defined limits.

80% (adjustable parameter) of the change in HICalTrim may be applied slowly, over 30 seconds (adjustable parameter). This may result in the method never using two successive calorimeter values unless the change is within the stability band.

The following assumptions may apply:

1/ The shape of new and clean engine characteristic is valid for all engine conditions.

2/ Engine is operating at approximately steady state (thermally).

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method of controlling a supply of a fuel to a combustor of a gas turbine comprising a compressor upstream of the combustor, the method comprising:

supplying the fuel to the combustor;

obtaining an inlet air pressure (PT7) at a compressor inlet;

obtaining an inlet air temperature (Tinlet) at the compressor inlet;

obtaining an outlet air pressure (PT8) at a compressor outlet;

obtaining an air bleed signal (THBOV) indicative of an amount of air not supplied to the combustor;

estimating a heat input (HIengmodel, HIexpected) of the fuel supplied to the combustor based on the inlet air pressure (PT7), the inlet air temperature (Tinlet), the outlet air pressure (PT8) and the air bleed signal (THBOV);

comparing the estimated heat input (HIengmodel, HIexpected) with a demanded heat input (FFDEM) to derive an error signal; and controlling a fuel valve regulating the supply of the fuel to the combustor based on the error signal.

2. The method according to claim 1, wherein the air bleed signal (THBOV) comprises a bleed valve setting.

3. The method according to claim 1, wherein estimating the heat input comprises:

forming a pressure ratio (PRC87) between the outlet air pressure (PT8) and the inlet air pressure (PT7) and estimating the heat input (HIengmodel, HIexpected) based on the pressure ratio.

4. The method according to claim 3, wherein estimating the heat input (HIengmodel, HIexpected) based on the pressure ratio (PRC87) comprises using at least one curve fit based on plural measurements performed on at least one gas turbines, the curve fit relating measured pressure ratio to measured heat input.

5. The method according to claim 4, wherein the curved fit is in particular described by a polynomial of second order having a positive first coefficient and a positive second coefficient.

6. The method according to claim 4, wherein a representation of the curve fit is stored in an electronic storage.

7. The method according to claim 4, wherein the at least one curve fit comprises:
   a first curve fit obtained based on measuring data, where no air was bled upstream of the combustor,
   a second curve fit obtained based on measuring data, where a portion of air was bled upstream of the combustor,
   wherein based on the first curve fit a first heat input (HIisonobleed) is derived and
   wherein based on the second curve fit a second heat input (HIiso10% bleed) is derived,
   wherein based on the first heat input and the second heat input the estimated heat input (HIengmodel, HIexpected) is derived.

8. The method according to claim 7, wherein the portion is between 5% and 20% of air bled upstream of the combustor.

9. The method according to claim 7, further comprising:
   deriving a corrected heat input (HIiso) using a first function comprising the first heat input (HIisonobleed) and the second heat input (HIiso10% bleed), if the pressure ratio (PRC87) exceeds a threshold;
   deriving the corrected heat input (HIiso) using a second function comprising at least the first heat input, if the pressure ratio (PRC87) does not exceed the threshold;
   wherein estimating the heat input (HIengmodel, HIexpected) is further based on the corrected heat input (HIiso).

10. The method according to claim 9, further comprising:
    calculating the estimated heat input (HIengmodel, HIexpected) from the corrected heat input (HIiso), the inlet air pressure (PT7) and the inlet air temperature (Tinlet).

11. The method according to claim 9, wherein the threshold is between 4 and 8.

12. The method according to claim 9, further comprising estimating a portion (bleed %) of air bled upstream of the combustor based on a bleed valve setting (THBOV), wherein the first function comprises the estimated portion of bleed air.

13. The method according to claim 12, wherein the bleed valve setting (THBOV) is estimated using a bleed valve characteristic.

14. The method according to claim 1, wherein the fuel valve is controlled using a Pi-controller to which the error signal is supplied as an input, the method further comprising:
   deriving a volume specific heat input (WIengcal) for the fuel based on the error signal; and
   transmitting the derived volume specific heat input (WIengcal) to the fuel valve, wherein based on the derived volume specific heat input the fuel valve is adjusted for controlling the supply of fuel.

15. The method according to claim 1, further comprising:
    setting the valve to a flow rate of the fuel such that the error signal is zero;
    the method afterwards comprising:
       supplying a second fuel to the combustor, the second fuel being different from the fuel;
       obtaining a second inlet air pressure (PT7) at the compressor inlet;
       obtaining a second inlet air temperature (Tinlet) at the compressor inlet;
       obtaining a second outlet air pressure (PT8) at the compressor outlet;
       estimating a second heat input (HIengmodel) of the second fuel supplied to the combustor based on the second inlet air pressure; the second inlet air temperature and the second outlet air pressure;
       comparing the second estimated heat input with the demanded heat input (FFDEM) to derive a second error signal; and
       controlling the valve based on the second error signal such that the valve is set to a second flow rate of the second fuel different from the flow rate of the fuel previously applied.

16. The method according to claim 15, wherein the second flow rate is higher than the flow rate, if the second estimated volume specific heat input is lower than the estimated volume specific heat input.

17. The method according to claim 15, wherein the fuel has a composition that is different from a composition of the second fuel.

18. An arrangement for controlling a supply of a fuel to a combustor of a gas turbine comprising a compressor upstream of the combustor, the arrangement comprising:
    a fuel valve configured to supply the fuel to the combustor;
    a processor configured
       to obtain an inlet air pressure (PT7) at a compressor inlet;
       to obtain an inlet air temperature (Tinlet) at the compressor inlet;
       to obtain an outlet air pressure (P18) at a compressor outlet;
       to obtain an air bleed signal (THBOV) indicative of an amount of air not supplied to the combustor;
       to estimate a heat input (HIengmodel) of the fuel supplied to the combustor based on the inlet air pressure; the inlet air temperature, the outlet air pressure and the air bleed signal (THBOV);
       to compare the estimated heat input (HIengmodel) with a demanded heat input (FFDEM) to derive an error signal; and
       to control the fuel valve regulating the supply of the fuel to the combustor based on the error signal.

* * * * *